Patented July 12, 1927.

1,635,759

UNITED STATES PATENT OFFICE.

GEORGE FREEMAN LLOYD, OF BRIGHTON, AND FREDERICK HARPER CAMPBELL, OF MELBOURNE, VICTORIA, AUSTRALIA, ASSIGNORS TO COMMONWEALTH WHITE LEAD AND PAINTS PROPRIETARY LIMITED, OF MELBOURNE, AUSTRALIA.

MANUFACTURE OF WHITE LEAD.

No Drawing. Application filed August 8, 1924, Serial No. 730,937, and in Australia August 10, 1923.

Experiments in the production of highly basic lead salts (i. e. containing a high percentage of lead hydroxide,) suitable for the manufacture of white lead have convinced us that one of the most suitable salts for all practical purposes is the basic sulphate.

According to the present invention therefore we treat lead monoxide with water and a small quantity of acetic or other suitable acid (e. g. nitric) to ensure the presence in the mixture of a certain amount of lead in water soluble form to facilitate the subsequent sulphating action. This mixture is brought to a suitable temperature and treated with concentrated sulphuric acid. If necessary to maintain a workable consistency more water is added to the mixture towards the end of the sulphating process. The reaction proceeds most smoothly when the mixture is ground during the whole of this stage in the manufacture.

The basic sulphate is treated in the cold with a mixture of a soluble bicarbonate of an alkali metal and water preferably in the form of a slurry there being undissolved carbonate present, and reaction occurs which results not merely in the displacement of the sulphate radicle but in the reduction of the basicity and our proportions of reagents are chosen in such a way that the white lead has a composition approximating to the theoretical (31.1% lead hydroxide).

The acid sulphates of the alkali metals can be substituted for equimolecular proportions of sulphuric acid with satisfactory results, that is to say not less than 26⅔ parts of potassium acid sulphate nor more than 42⅔ parts or alternately not less than 23⅔ nor more than 37⅔ parts of sodium acid sulphate for each 112 parts of lead monoxide.

In order that the composition of the white lead may approximate the theoretical it is necessary that the proportion of water present during sulphating shall not be less than ½ nor more than 2 parts by weight for each 1 part of litharge treated.

The temperature obtaining during the formation of the basic sulphate has a considerable influence upon its physical properties. Unless it exceeds 40° C. the reaction is inconveniently slow and if it is permitted to rise from this temperature too rapidly the basic sulphate sets in an intractable mass. Unless the directions as to limits of temperature indicated are observed a basic sulphate is obtained which is apt to contain unchanged litharge admixed with a sulphate the basicity of which is not as high as that aimed at. Such a mixture on being carbonated gives rise to a white lead of inferior colour and containing too small a percentage of hydroxide.

The composition of the product depends upon two principal factors namely the proportions of sulphuric acid and sodium bicarbonate and according to our invention we form a highly basic sulphate (e. g. from 60 to 76½% lead hydroxide assuming the formula $x\text{Pb(OH)}_2 \cdot y\text{PbSO}_4$) by the use of a relatively small proportion of sulphuric acid and the conversion of this into a basic carbonate containing approximately 30% lead hydroxide by the addition of a suitable amount of the bicarbonate of an alkali metal. The lower limit of the amount of the latter which can be used is that which yields a commercially pure basic carbonate, that is one free from lead sulphate as well as other impurities. The limits between which the proportions of the reagents named can be varied are accordingly not widely separated and we find that for each 112 parts of litharge the amount of concentrated (96%) sulphuric acid should be between 10 and 16 parts by weight and the sodium bicarbonate between 27 and 30 parts by weight.

We do not claim any particular proportion of acetic acid, but find that from 1 to 2½ parts of 30% acid for 112 parts of litharge are suitable amounts.

If desired a mixture of sodium bicarbonate and sodium carbonate may be used for converting the basic sulphate to basic carbonate, in the approximate ratio of 2 to 1.

Without limiting the scope of our invention the following example is illustrative of its practical working:—We take 112 lbs. of litharge free from red lead and substantially free from metallic lead, mix with it 95 lbs. of warm water and 2½ lbs. of 30% acetic acid. The mixture is heated to about 40° C., by blowing in steam, or by other suitable means, while being ground in a Chilean mill or other suitable device. Twelve pounds of sulphuric acid (96%) is introduced in the form of a thin stream, the rate being determined by the temperature, which should not rise materially above 50° C. When the greater part (say 9 lbs.) of the sulphuric acid has been added about 20 lbs. of water is introduced and then the rest of the acid. We convert the basic sulphate into basic carbonate by the addition of 30 lbs. of sodium bicarbonate previously mixed with 80 lbs. of cold water. After completion of the action, under the influence of grinding, the material is washed with water and dried, or mixed with oil and ground.

We claim:

1. The manufacture of white lead, which comprises mixing 112 lbs. of lead monoxide free from red lead and substantially free from metallic lead with about 95 lbs. warm water and an acid capable of forming water-soluble lead salts equivalent to about two and one-half pounds of 30% acetic acid, heating the mixture to about 40° C. while grinding, introducing an acid sulphating reagent equal to about 12 pounds of 96% sulphuric acid in a thin stream with about 20 pounds of water, converting the basic sulphate thus formed into basic carbonate by the addition of an alkali metal carbonating reagent equivalent to not less than 27 nor more than 30 lbs. of sodium bicarbonate previously mixed with about 80 lbs. of cold water under the influence of grinding, and washing and drying the resultant basic carbonate.

2. In the manufacture of white lead, the step which comprises reacting upon 112 parts of lead monoxide with a sulphating reagent equivalent to 10 to 16 parts of concentrated sulphuric acid in the presence of a small quantity of an acid capable of forming water soluble lead salt, and water in the proportion of not less than one-half and not more than two parts of water for each part of lead monoxide treated.

3. In the manufacture of white lead, the step of converting the basic sulphate of lead containing from 60 to 76.50 per cent of lead hydroxide into basic carbonate of lead containing approximately 30 per cent of lead hydroxide, which comprises reacting on such sulphate with an alkali metal carbonating reagent equivalent to not less than 27 nor more than 30 parts of sodium bicarbonate and sufficient water for such agent to be partly in suspension and partly in solution.

Dated this sixteenth day of June 1924.

GEORGE FREEMAN LLOYD.
FREDERICK HARPER CAMPBELL.